United States Patent Office 3,188,885
Patented June 15, 1965

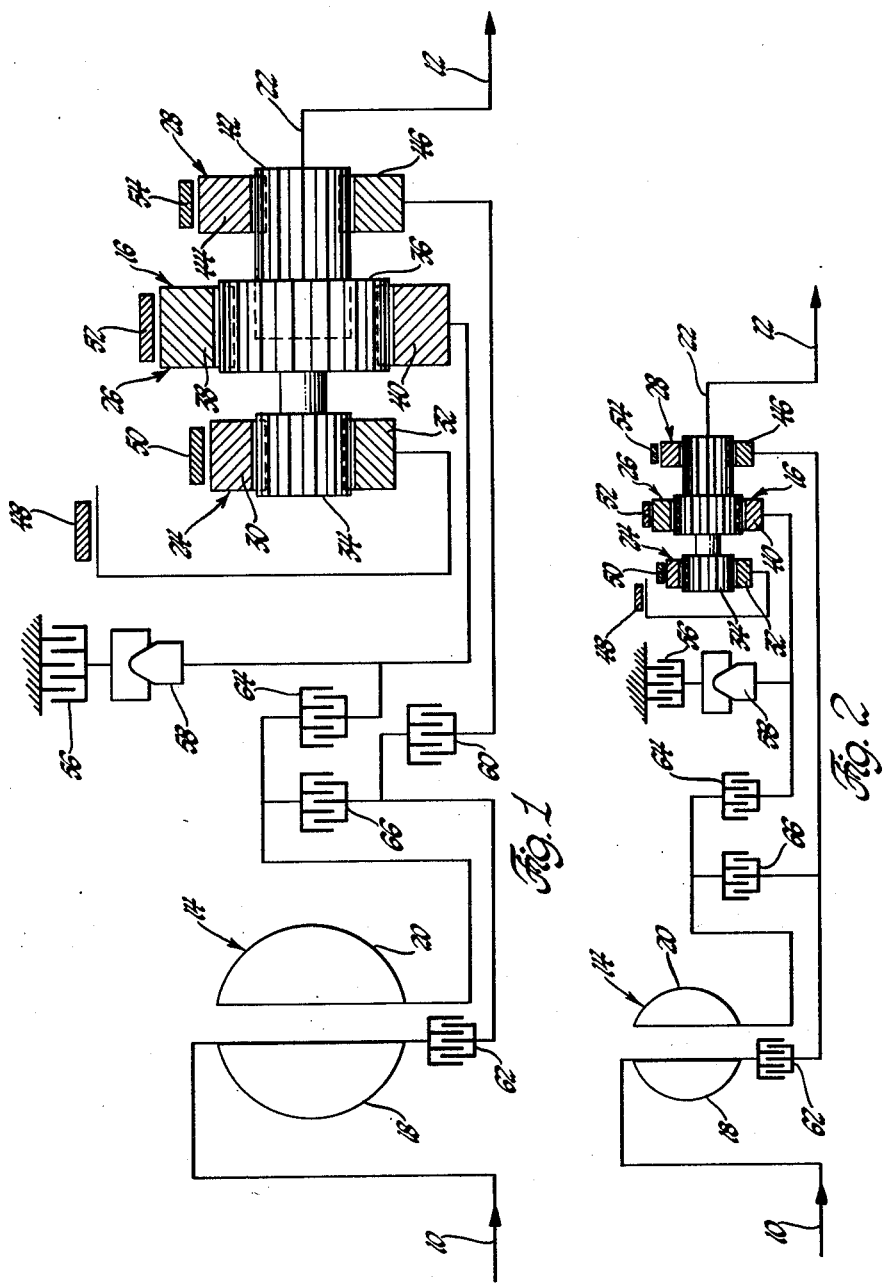

3,188,885
TRANSMISSION
Hugh L. Fisher, Birmingham, Mich., assignor to General Motors Corporation, Detroit, Mich., a corporation of Delaware
Filed Aug. 28, 1962, Ser. No. 219,907
8 Claims. (Cl. 74—688)

This invention relates to improvements in multistep ratio transmissions.

An automatic transmission to be suitable for use with trucks and various off-the-road vehicles such as tractors, road graders, scrapers, etc., requires considerable more ratio coverage both in forward and reverse drives than is ordinarily available in the conventional passenger car transmission. Usually a passenger car transmission provides three or four forward drive ratios and a single reverse drive ratio. For this reason, some installations have employed an automatic transmission in series with a manual transmission to gain greater ratio coverage. For example, if the automatic transmission affords three forward drive ratios and the manual transmission two forward drive ratios, a total of six ratios are made available. This arrangement of course, does not provide fully automatic operation and is costly because there are two complete transmissions involved. To gain automatic operation, two automatic transmissions have been installed in parallel but synchronization is a problem; therefore, the controls are complex.

For these reasons, the invention contemplates a novel transmission that is particularly suited for automatic operation in a plurality of forward as well as reverse drive ratios. With the novel transmission, the range of ratios or the ratio coverage in both forward and reverse drive can be varied considerably to meet the requirements of different applications. Specifically, the transmission provides six forward drive ratios and four reverse drive ratios.

Another problem encountered whenever it is attempted to increase the number of drive ratios afforded by a transmission is the substantial number of gears required if of the spur type; or, if of the planetary type, the number of planetary gearsets demanded. In either case, the numerous gears all require space and thus elongate the transmission. The elongated transmission in turn increases the cost. In fact, space requirements may preclude the use of an elongated transmission.

Accordingly, the invention further contemplates a novel arrangement of gearing that utilizes a minimum number of elements to obtain a maximum number of forward drive and reverse drive ratios suitable for commercial as well as other applications; that is compact so as to require minimum space; that avoids any complex compounding of gearing; and that uses ratio changing devices for at one time establishing a forward drive ratio and another time completing a reverse drive ratio train, thus combining functions while reducing the number of ratio changing devices required.

A further and related aim of the invention is to interrelate and interconnect several planetary gear elements while only requiring a single planet carrier.

The foregoing and other aims and advantages of the invention will become apparent from the following description and from the accompanying drawings in which:

FIGURE 1 is a schematic illustration of a transmission incorporating the principles of the invention; and FIGURE 2 is a schematic showing of a modification of the FIGURE 1 transmission.

Referring now to the drawings, the numerals 10 and 12, respectively, denote input and output shafts. The shafts 10 and 12 may be connected respectively to the vehicle engine and the vehicle wheels (neither shown) in the usual way. Interposed between the shafts 10 and 12 are a hydrodynamic torque transmitting device such as a fluid coupling 14, which may be replaced by a torque converter if wanted, and planetary gearing designated generally by the numeral 16. As will become apparent, the transmission provides six forward drive ratios in the forward drive range and four reverse drive ratios in the reverse drive range.

The fluid coupling 14 comprises an impeller 18 drive connected to the input shaft 10 and a turbine 20. Drive is transferred by the fluid coupling 14 through the agency of fluid in a known manner. Fluid coupling 14 in this transmission provides a fluid start and subsequently may, in effect, be bypassed to avoid the inherent fluid losses if desired.

The planetary gearing 16 has a single planet carrier 22 drive connected to the output shaft 12. The planetary gearing 16 further comprises a first or front planetary gearset 24, a second or intermediate planetary gearset 26, and a third or rear planetary gearset 28. The front planetary gearset 24 includes a ring gear 30 and a sun gear 32 both of which mesh with one or more planet pinions 34. The planet pinions 34 are preferably formed integral with one or more planet pinions 36 for the intermediate gearset 26. If the planet pinions 34 and 36 cannot be formed integral for any reason, then they can be fixedly joined in any suitable way. Each integral set of pinions 34 and 36 are revolvably supported on the carrier 22. Meshing with the pinions 36 and completing the intermediate gearset 26 are a ring gear 38 and a sun gear 40. The planet pinion 36 meshes with an elongated planet pinion 42, also removably mounted on the planet carrier 22. There may be more than one elongated planet pinion 42 in which event each pinion 42 will mesh with a corresponding pinion 36 assuming there are an equivalent number of each of the pinions 36 and 42. The elongated pinion 42 by extending rearwardly also serves as a part of the rear planetary gearset 28 and intermeshes with a ring gear 44 and a sun gear 46.

The different forward and reverse drive ratios in each range of operation are provided through the use of friction brakes 48, 50, 52, and 54, which respectively prevent rotation of the front gearset sun gear 32, the front gearset ring gear 30, the intermediate gearset ring gear 38 and the rear gearset ring gear 44. Additionally, the combination of a brake 56 and a one-way device 58 prevent, when desired, backward rotation of the intermediate gearset sun gear 40. The one-way device 58 is of known construction utilizing locking elements such as sprags or rollers for preventing relative rotation between the races. Several clutches 60, 62, 64, and 66 are employed in the FIGURE 1 transmission and are operated to facilitate the different ratio changes as will be explained in the operational summary.

The various clutches and brakes may all be of any known type, e.g., the brakes may employ disks, bands, or cones. Similarly, the clutches may have disks, cones, etc. The clutches and brakes are either operated electrically, mechanically, or hydraulically in any suitable way and in a sequence to be described.

Considering first the FIGURE 1 transmission and its forward drive range of operation, in the first forward drive ratio, torque is transferred through the fluid coupling 14 to afford a fluid start and to the sun gear 40 via engaged clutch 64. The brake 50 is engaged and the output shaft 12 is therefore revolved forwardly. In this first drive ratio maximum output torque is available.

For the second forward drive ratio to be established, the fluid coupling 14 is maintained filled and the clutch 64 is still engaged. The only additional requirement for completing the second drive ratio train is that brake 52 now be engaged instead of brake 50. Drive still proceeds as in the first forward drive ratio but the ring gear 38 serves as a reactor and the output shaft 12 provides slightly less torque than in the first drive ratio.

In the third drive ratio, only the brake 54 and the clutches 60 and 62 are engaged. The fluid coupling 14 is no longer needed, being in effect bypassed, and can be emptied thus avoiding the inherent fluid losses. Drive is from the impeller 18 of the fluid coupling 14 through clutches 60 and 62 and to the rear gearset sun gear 46. With the rear gearset ring gear 44 serving as a reactor, the output shaft 12 has a torque applied thereto that is slightly less than that in the second drive ratio.

The fourth forward drive ratio only requires a change of reactors. This is done by engaging the brake 48 and disengaging the brake 54. The brake 48 holds the front gearset sun gear 32. Therefore, torque is applied to the rear gearset sun gear 46 and the resultant torque multiplication by the gearing 16 becomes less than that afforded in the third drive ratio.

The fifth forward drive ratio is established when the brake 48 is disengaged and the brake 56 engaged. The brake 56 combines with the one-way device 58 to prevent backward rotation of the intermediate gearset sun gear 40. The rear gearset sun gear 46 still serves as an input and now the output shaft 12 is revolved slightly faster in the fourth drive ratio.

The fluid coupling 14 can be used in the third, fourth, and fifth forward drive ratios. If this is preferred, the clutch 62 can be eliminated, but the clutch 66 will have to be engaged in each of these drive ratios.

The sixth and final forward drive ratio is obtained by engaging all of the clutches 60, 62, 64, and 66 so as to cause both the intermediate gearset sun gear 40 and the rear gearset sun gear 46 to be driven at the same speed, thus locking up the planetary gearing 26. A true direct drive ratio occurs between the input and output shafts 10 and 12, since the fluid coupling 14 is still maintained empty. If preferred, the coupling 14 can be filled so as to be effective and the clutch 62 disengaged. A true direct drive now would not be possible. Or, the fluid coupling 14 can be filled when all of the clutches 60, 62, 64, and 66 are engaged without interfering with the operation. There is no need when shifting between the fifth and the sixth forward drive ratios to disengage the brake 56 since the one-way device 58 unlocks when the intermediate gearset sun gear 40 is driven forwardly.

The reverse drive range affords, as mentioned, four different drive ratios. Also, the reverse drive range includes a fluid start in the first reverse drive ratio.

In the first reverse drive ratio, the coupling 14 is filled and the brake 50 and the clutches 60 and 66 are all engaged. Drive is from the input shaft 10 through the fluid coupling 14 and the clutches 60 and 66 to the rear gearset sun gear 46. With the brake 50 holding the front gearset ring gear 30, the planet carrier 22 and accordingly the output shaft 12 are driven backward, the applied reverse torque being maximum in this first drive ratio.

The second reverse drive ratio eliminates the fluid coupling 14, and therefore, the fluid coupling 14 can be dumped so as to avoid further fluid losses. The brake 54 and each of the clutches 62, 64, and 66 are engaged so that drive is supplied to the intermediate gearset sun gear 40. The rear gearset ring gear 44 is held by the brake 54, thus affording a reaction that causes the output shaft 12 to be driven backwards by a torque that is slightly less than that applied to the output shaft 12 in the first reverse drive ratio.

To establish the third reverse drive ratio, the clutches 60 and 62 are engaged so that the rear gearset sun gear 46 receives the drive. The intermediate gearset ring gear 38 is prevented from rotating by the brake 52 so that now the output shaft 12 has a reverse torque applied thereto that is somewhat less than that in the second reverse drive ratio.

The fourth reverse drive ratio is established by engaging each of the clutches 62, 64, and 66 so that the intermediate gearset sun gear 40 receives the drive from the input shaft 10. The front gearset sun gear 32 serves as a reactor, being held by the brake 48, and therefore, the output shaft 12 is driven somewhat faster backwards than in the third reverse drive ratio.

With this FIGURE 1 transmission, the fluid coupling 14 is only effective in the first reverse drive ratio and in the first and the second forward drive ratios unless the mentioned changes are made in the forward drive range. If there is no objection to utilizing the fluid coupling 14 more frequently in the reverse drive, then one of the clutches in FIGURE 1 can be eliminated. Specifically, clutch 60 can be eliminated and the transmission will appear as illustrated in FIGURE 2. Therefore, in the third, fourth, and fifth forward drive ratios, only the clutch 62 must be engaged, whereas in the sixth forward drive ratio, only the clutches 64 and 66 are engaged.

With the FIGURE 2 transmission operating in the reverse drive range, the first reverse drive ratio only requires that the clutch 66 be engaged and of course, the coupling 14 is filled and is operative. The second reverse drive ratio still requires the fluid coupling 14 and additionally that the clutch 64 be engaged. For the third reverse drive ratio, the fluid coupling 14 continues in effect, the clutch 64 is disengaged, and the clutch 66 is engaged. Then, in the fourth reverse drive ratio, the clutch 66 is disengaged and the clutch 64 is re-engaged, and again the fluid coupling 14 continues to transfer drive to the clutch 64. Actually, in the reverse drive range, the clutches 66 and 64 alternate as the transmission shifts from first to second, second to third, and third to fourth reverse drive ratios.

To further appreciate the substantial ratio coverage possible with the FIGURES 1 and 2 transmissions, each of the gears have been assigned the indicated number of teeth:

| Gear: | No. of teeth |
|---|---|
| 30 | 73 |
| 32 | 35 |
| 34 | 19 |
| 36 | 31 |
| 38 | 85 |
| 40 | 23 |
| 42 | 18 |
| 44 | 67 |
| 46 | 31 |

With these numbers of teeth, the FIGURE 1 transmission, when having the indicated status, will provide the denoted numerical ratios:

| Drive Ratio | Forward Drive Range | Ratio |
|---|---|---|
| 1st | Input to Gear 40; Brake 50 engaged; Coupling 14 filled; Clutch 64 engaged. | 6.178 |
| 2nd | Input to Gear 40; Brake 52 engaged; Coupling 14 filled; Clutch 64 engaged. | 4.696 |
| 3rd | Input to Gear 46; Brake 54 engaged; Clutches 60 and 62 engaged. | 3.161 |
| 4th | Input to Gear 46; Brake 48 engaged; Clutches 60 and 62 engaged. | 2.842 |
| 5th | Input to Gear 46; Brake 56 engaged; Clutches 60 and 62 engaged. | 1.742 |
| 6th | Input to both gear 40 and gear 46; clutches 60, 62, 64, 66 engaged. | 1 |
| | Reverse Drive Range | |
| 1st | Input to Gear 46; Brake 50 engaged; Coupling 14 filled; Clutches 60 and 66 engaged. | 2.842 |
| 2nd | Input to Gear 40; Brake 54 engaged; Clutches 62, 64, and 66 engaged. | 1.913 |
| 3rd | Input to Gear 40; Brake 25 engaged; Clutches 60 and 62 engaged. | 1.742 |
| 4th | Input to Gear 40; Brake 48 engaged; Clutches 62, 64, and 66 engaged. | 1.483 |

Of course, it is to be understood that the tooth numbers are for exemplary purposes only and can be varied to meet the requirements of a particular application. Moreover, fewer ratios can be used, if preferred.

From the foregoing, it will now be appreciated that the transmission requires a minimum number of gears, uses the brakes and clutches both in the forward and the reverse drive ranges, is versatile, and can operate very efficiently with a minimum of fluid losses while still providing a fluid start. The ratio coverage is substantial and even can be supplemented by replacing the fluid coupling 14 with a torque converter if desired. This would considerably increase the ratio coverage obtainable in reverse drive range where the FIGURE 2 transmission is employed and the fluid coupling 14 is always effective. With a torque converter having, e.g., a 4:1 multiplication, the product of this multiplication and the reverse drive ratio indicated would provide four times as much ratio in each reverse drive ratio. Also, it will be noted that in the forward drive range, brakes 50, 52, 54, 48 and 56 are successively engaged as upshifts occur, thus simplifying the interconnection of the brake structures and controls.

The invention is to be limited only by the following claims:

1. A multistep ratio planetary gear transmission comprising a pair of input sun gears; an output planet carrier having an elongated planet pinion and a pair of integral and different diameter planet pinions journaled thereon; the elongated planet pinion and one of the pair of planet pinions being in intermeshing relation, one of the input sun gears meshing with the elongated pinion; the other input sun gear meshing with said one of the pair of planet pinions; a series of reaction ring gears meshing respectively with the elongated planet pinion, said one of the pair of planet pinions, and the other of the pair of planet pinions; a reaction sun gear meshing with said other of the pair of planet pinions; first and second drive ratio brakes respectively operative to hold successively the reaction ring gear meshing with said other of the pair of planet pinions and the reaction ring gear meshing with said one of the pair of planet pinions while said other input sun gear is serving as an input so as to provide corresponding first and second drive ratios; third, fourth, and fifth drive ratio brakes respectively operative to hold successively the reaction ring gear meshing with the elongated planet pinion, the reaction sun gear, and said other input sun gear while said one input sun gear is serving as an input to afford corresponding third, fourth, and fifth drive ratios; and clutch means for joining the pair of input sun gears so as to provide a sixth and direct drive speed ratio.

2. A multistep ratio planetary gear transmission comprising a power source; a load; first, second, and third planetary gearsets all having a common planet carrier drive connected to the load; each planetary gearset having a planet pinion journaled on the planet carrier and ring and sun gears meshing with the planet pinion; the first and second gearset planet pinions being drive connected together; the second and third gearset planet pinions being in intermeshing relation; means selectively connecting the second and third gearset sun gears to the power source; a series of brakes operative in a certain sequence to hold successively the first gearset ring gear and the second gearset ring gear while the second gearset sun gear is connected to the power source so as to provide first and second drive ratios and to brake successively the third gearset ring gear, the first gearset sun gear, and the second gearset sun gear while the third gearset sun gear is connected to the power source so as to provide third, fourth, and fifth drive ratios; and clutch means joining the second and third gearset sun gears so as to provide a sixth and direct drive ratio through the transmission.

3. A multistep ratio transmission comprising a power source; a load; first, second, and third planetary gearsets all having a common planet carrier drive connected to the load and each having a planet pinion journaled on the planet carrier and a pair of gear elements meshing with each planet pinion; the first gearset planet pinion being drive connected to the second gearset planet pinion; the second gearset planet pinion being in intermeshing relation with the third gearset planet pinion; means selectively clutching one gear element of the second gearset and one gear element of the third gearset to the power source; a series of brakes each individually operative in a certain sequence to hold successively one gear element of the first gearset and the other gear element of the second gearset against rotation in one direction when the said one gear element of the second gearset is joined to the power source so as to provide first and second drive ratios and to hold successively the other gear element of the third gearset, the other element of the first gearset and the one gear element of the second gearset against rotation when said one gear element of the third gearset is connected to the power source so as to provide third, fourth, and fifth drive ratios; and clutch means for joining both said one gear element of the second and the third gearsets so as to provide a sixth and direct drive ratio through the transmission.

4. A multistep ratio transmission comprising a power source; a load; first, second, and third planetary gearsets all having a common planet carrier drive connected to the load and each having a planet pinion journaled on the planet carrier and a pair of gear elements meshing with each planet pinion; the first gearset planet pinion being drive connected to the second gearset planet pinion; the second gearset planet pinion being in intermeshing relation with the third gearset planet pinion; means selectively clutching one gear element of the second gearset and one gear element of the third gearset to the power source; a series of brakes each individually operative in one sequence to hold successively one gear element of the first gearset and the other gear element of the second gearset against rotation in one direction when the said one gear element of the second gearset is joined to the power source so as to provide first and second forward drive ratios and to hold successively the other gear element of the third gearset, the other gear element of the first gearset, and said one gear element of the second gearset against rotation when said one gear element of the third gearset is connected to the power source so as to provide third, fourth, and fifth forward drive ratios; and clutch means for joining both said one gear element of the second and the third gearsets so as to provide a sixth and direct drive ratio through the transmission; the series of brakes also being individually operative in another sequence to hold successively said one gear element of the first gearset while the said one gear element of the third gearset is serving as an input to provide a first reverse drive ratio, for holding said other gear element of the third gearset while the said one gear element of the second gearset is serving as an input to provide a second reverse drive ratio, for holding said other gear element of the second gearset while said one gear element of the third gearset is serving as an input to provide a third reverse drive ratio, and for holding said other gear element of the first gearset while said one gear element of the second gearset is serving as an input to provide a fourth reverse drive ratio.

5. In a multistep ratio transmission; the combination of a power source; a load; a hydrodynamic torque transmitting device having an impeller drive connected to the power source and a turbine; planetary gearing having a common carrier drive connected to the load, the planetary gearing including first, second, and third planetary gearsets each having a planet pinion journaled on the planet carrier and ring and sun gears meshing with the planet pinion; the first and second gearset planet pinions being drive connected together; the second and third gearset planet pinions being in intermeshing relation; clutch means selectively drive connecting the second gearset sun gear to the turbine and the third gearset sun gear to the impeller; a series of brakes each individually operative in one sequence to hold successively the first gearset ring gear and the second gearset ring gear while the second gearset sun gear is drive connected by the clutch means to the turbine so as to provide first and second forward drive ratios and to hold successively the third gearset ring gear, the first gearset sun gear, and the second gearset sun gear while the third gearset sun gear is joined to the impeller by the clutch means so as to provide third, fourth, and fifth forward drive ratios, the clutch means also joining the second and third gearset sun gears together to provide a sixth and direct drive ratio through the planetary gearing; the series of brakes also being individually operative in another sequence to hold successively the first gearset ring gear, the third gearset ring gear, the second gearset ring gear, and the first gearset sun gear while the clutch means initially drive connects the third gearset sun gear to the turbine and thereafter alternately drive connects the second and the third gearset sun gears to the impeller so as to provide first, second, third, and fourth reverse drive ratios.

6. In a multistep ratio transmission, the combination of a power source; a load; a hydrodynamic torque transmitting device drive connected to the power source; planetary gearing having a common carrier drive connected to the load, the planetary gearing including first, second, and third planetary gearsets each having a planet pinion journaled on the planet carrier and a pair of gear elements meshing with the planet pinion; the first and second gearset planet pinions being drive connected together; the second and third gearset planet pinions being in intermeshing relation; clutch means selectively drive connecting one gear element of the second gearset and one gear element of the third gearset sun gear to the device; a series of brakes each individually operative in a certain sequence to hold successively one gear element of the first gearset and the other gear element of the second gearset while said one gear element of the second gearset is drive connected by the clutch means to the device so as to provide first and second forward drive ratios and to hold successively the other gear element of the third gearset, the other gear element of the first gearset, and said one gear element of the second gearset while said one gear element of the third gearset is joined to the device by the clutch means so as to provide third, fourth, and fifth forward drive ratios; the clutch means also joining said one gear element of the second and third gearsets together to provide a sixth and direct drive ratio through the planetary gearing; the brake means also successively holding said one gear element of the first gearset, said other gear element of the third gearset, said other gear element of the second gearset, and said other gear element of the first gearset while the clutch means initially drive connects said one gear element of the third gearset to the device and thereafter alternately drive connects said one gear element of the second and the third gearsets to the device so as to provide first, second, third, and fourth reverse drive ratios.

7. A multistep ratio planetary gear transmission comprising a power source; a load; first, second, and third planetary gearsets all having a common planet carrier drive connected to the load; each planetary gearset having plural gears and a planet pinion journaled on the planet carrier so as to mesh with each of the plural gears; the first and second gearset planet pinions being drive connected together; the second and third gearset planet pinions being in intermeshing relation; means selectively and individually connecting one of the gears of each of the second and the third gearsets to the power source so that said one gear serves as an input gear for the associated gearset; and a series of brakes each operative to hold one of the gears, the series of brakes being operative in a certain sequence to hold successively corresponding ones of the gears in the planetary gearsets while said input gears for the second and the third gearsets are selectively connected to the power source by the connecting means so as to provide a plurality of both forward and reverse drive ratios.

8. A multistep ratio planetary gear transmission comprising a power source; a load; a hydrodynamic torque transmitting device; first, second, and third planetary gearsets all having a common planet carrier drive connected to the load; each planetary gearset having plural gears and a planet pinion journaled on the planet carrier so as to mesh with each of the plural gears; the first and second gearset planet pinions being drive connected together; the second and third gearset planet pinions being in intermeshing relation; means selectively and individually connecting one of the gears of each of the second and the third gearsets to the power source so that said one gear serves as an input gear for the associated gearset; a series of brakes each operative to hold one of the gears, the series of brakes being operative in a certain sequence to hold successively corresponding ones of the gears in the planetary gearsets while said input gears for the second and the third gearsets are selectively connected to the power source by the connecting means so as to provide a plurality of both forward and reverse drive ratios; and means rendering the hydrodynamic torque transmitting means operative in the starting forward and reverse drive ratios to provide a fluid start.

References Cited by the Examiner
UNITED STATES PATENTS

| | | | |
|---|---|---|---|
| 1,231,529 | 6/17 | Pollard | 74—761 |
| 1,256,373 | 2/18 | Rowledge | 74—761 |
| 3,063,309 | 11/62 | Grattan | 74—761 X |
| 3,106,107 | 10/63 | Hardy | 74—761 X |
| 3,108,495 | 10/63 | Winchell | 74—761 |

DON A. WAITE, *Primary Examiner.*

UNITED STATES PATENT OFFICE
CERTIFICATE OF CORRECTION

Patent No. 3,188,885　　　　　　　　　　　　　　　　　June 15, 1965

Hugh L. Fisher

It is hereby certified that error appears in the above numbered patent requiring correction and that the said Letters Patent should read as corrected below.

Column 4, lines 50 to 70, in the chart, under the heading "Reverse Drive Range", line 5 thereof, for "Brake 25" read -- Brake 52 --.

Signed and sealed this 14th day of December 1965.

(SEAL)
Attest:

RNEST W. SWIDER
Attesting Officer

EDWARD J. BRENNER
Commissioner of Patents